(12) United States Patent
Chang et al.

(10) Patent No.: US 8,121,416 B2
(45) Date of Patent: Feb. 21, 2012

(54) SYSTEM AND METHOD FOR DETERMINING INFLECTION POINTS IN AN IMAGE OF AN OBJECT

(75) Inventors: Chih-Kuang Chang, Taipei Hsien (TW); Yong-Hong Ding, Shenzhen (CN); Li Jiang, Shenzhen (CN); Zhong-Kui Yuan, Shenzhen (CN); Xiao-Guang Xue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 465 days.

(21) Appl. No.: 12/488,553

(22) Filed: Jun. 20, 2009

(65) Prior Publication Data

US 2010/0104198 A1 Apr. 29, 2010

(51) Int. Cl.
*G06K 9/46* (2006.01)
*G06K 9/40* (2006.01)

(52) U.S. Cl. ........ 382/201; 382/202; 382/204; 382/199; 382/266

(58) Field of Classification Search .................. 382/190, 382/192, 193, 194, 195, 199, 201, 202, 204, 382/266
See application file for complete search history.

(56) References Cited

U.S. PATENT DOCUMENTS

| | | | |
|---|---|---|---|
| 5,859,929 A * | 1/1999 | Zhou et al. | 382/175 |
| 5,960,102 A * | 9/1999 | Van Eeuwijk et al. | 382/128 |
| 6,477,273 B1 * | 11/2002 | Cole Atkinson | 382/174 |
| 2010/0124359 A1 * | 5/2010 | Vaidya | 382/103 |

* cited by examiner

*Primary Examiner* — Brian Le
(74) *Attorney, Agent, or Firm* — Altis Law Group, Inc.

(57) ABSTRACT

A system and method for determining inflection points in an image of an object includes obtaining the image of the object, performing binary image processing on a border of the image to obtain border points, selecting a predetermined number of the border points to fit a straight line, calculating a vertical distance between each selected border point and the straight line, and obtaining a total distance. The method further includes adding a new border point to the selected border points if the total distance is less than a predetermined value, so as to fit a new straight line and do a loop cycle, otherwise, regarding a last border point of the selected border points as an inflection point, and sequentially selecting the predetermined number of other border points to fit another new straight line.

19 Claims, 5 Drawing Sheets

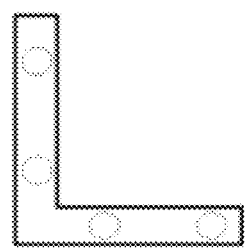
FIG. 2a
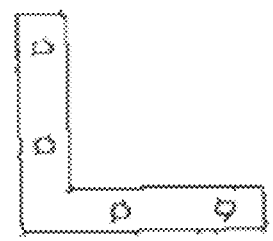
FIG. 2b
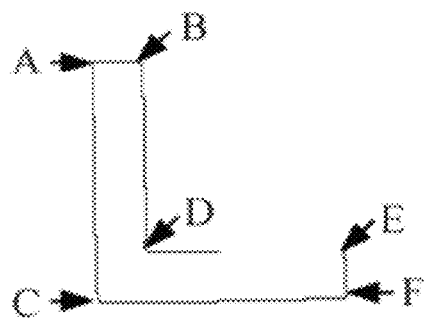
FIG. 2c
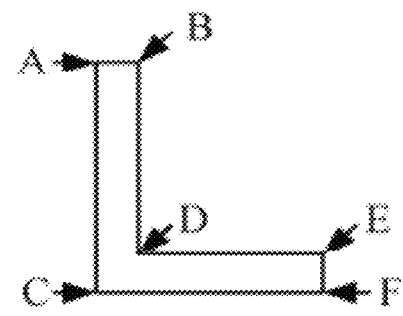
FIG. 2d
FIG. 2

SYSTEM AND METHOD FOR DETERMINING INFLECTION POINTS IN AN IMAGE OF AN OBJECT

BACKGROUND

1. Technical Field

Embodiments of the present disclosure relate to systems and methods for measuring objects, and particularly to a system and method for determining inflection points in an image of an object.

2. Description of Related Art

At present, one method for detecting shape tolerances of products is to compare each border point in an image of an object to be measured with each border point in an model image of an model object, so as to determine if an outline of the object to be measured matches an outline of the model object. However, if the image of the object to be measured has a large number of border points, it will take much time to compare the border points in the image with the border points in the model image, thus the measurement speed is very low.

BRIEF DESCRIPTION OF THE DRAWINGS

FIG. 2 is a schematic diagram of one embodiment of determining inflection points in an image of an object;

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
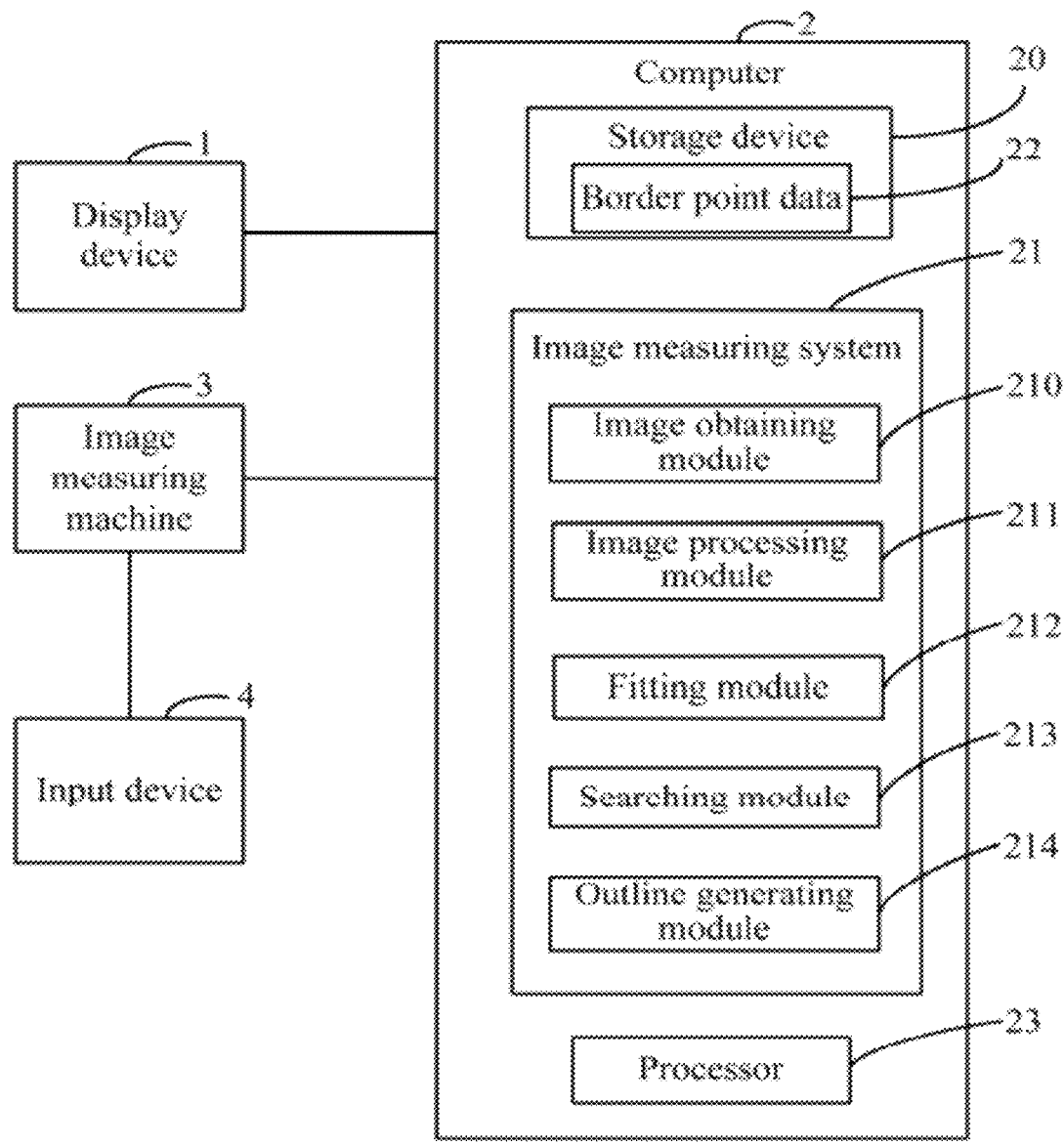
FIG. 1 is a block diagram of one embodiment of a computer comprising a system for determining inflection points in an image of an object.

FIG. 1 is a block diagram of one embodiment of a computer 2 comprising an image measuring system 21 for determining inflection points in an image of an object. In one embodiment, the computer 2 is electronically connected to a display device 1, and an image measuring machine 3. The display device 1 is used to display images of the object (e.g., an edge of a mobile phone) captured by the image measuring machine 3. The display device 1 may be a liquid crystal display (LCD) or an cathode ray tube (CRT) display, for example.

The computer 2 further includes a storage device 20. The storage device 20 may store many kinds of information, such as border point data 22 of the object to be measured. In one embodiment, border points are point-clouds of a border of the object. The image measuring system 21 is used to search for inflection points in an image of the object (a detailed description will be shown in the followed paragraphs).

The image measuring machine 3 is connected to an input device 4. In one embodiment, the input device 4 is provided for manually moving one or more parts of the image measuring machine 3. The input device 4 may be a jack with a handle to manually adjust positions of the image measuring machine 3 to perform focusing, although the disclosure is not limited thereto.

In one embodiment, the image measuring system 21 includes an image obtaining module 210, an image processing module 211, a fitting module 212, a searching module 213, and an outline generating module 214. In one embodiment, the modules 210-214 may comprise one or more computerized instructions that are stored in the storage device 20. A processor 23 of the computer 2 may execute the computerized instructions to implement one or more operations of the image measuring system 21.

The image obtaining module 210 obtains an image of an object (refer to FIG. 2a) from the image measuring machine 3.

The image processing module 211 performs binary image processing on a border of the image to obtain a binary image (refer to FIG. 2b), obtains border points in the binary image, and stores data of the border points in the storage device 20. In one embodiment, the border points may be sequential. It may be understood that the binary image has only two possible values for each pixel in the binary image. Usually, two colors used for the binary image are black and white, although any two colors can be used. In one embodiment, the color used for the object in the image is the foreground color (such as black), while the rest of the image is the background color (such as white). In one embodiment, the image processing module 212 only performs the binary image processing on the border of the captured image, so as to decrease the number of binary processing calculations.

Figure 4:
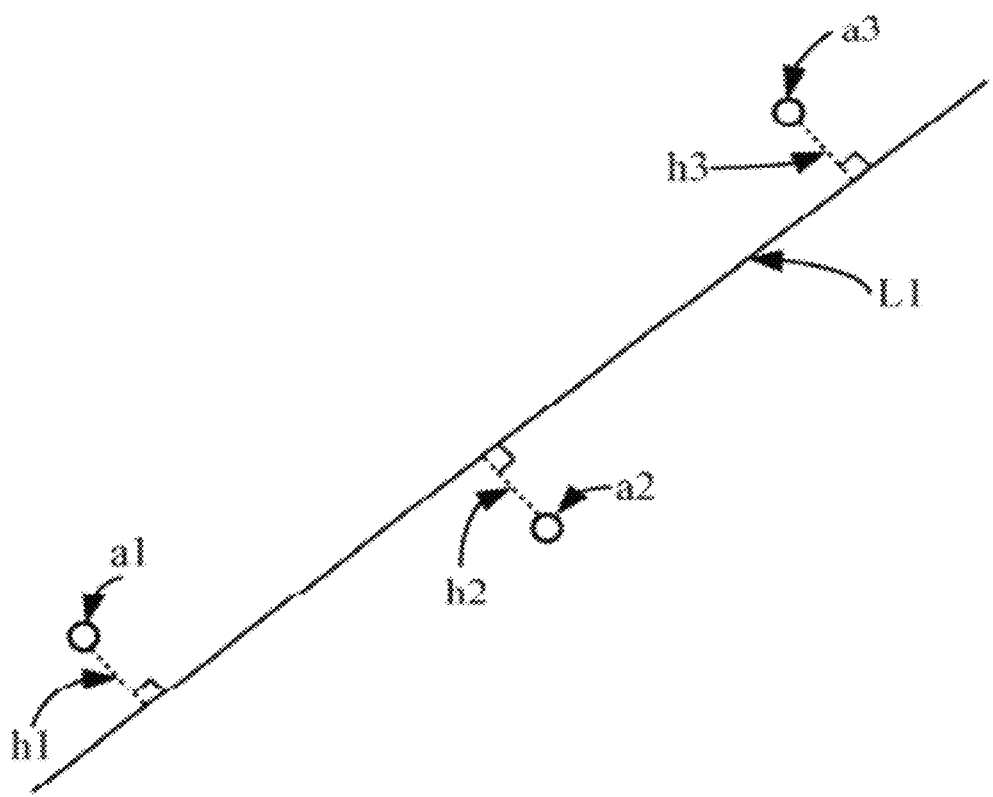
FIG. 4 is a schematic diagram of one embodiment of fitting a straight line L1.

The fitting module 212 selects a predetermined number of border points (e.g., sequential border points of a1, a2 and a3 shown in FIG. 4) in the binary image to fit a straight line (e.g., a straight line L1 fitted from the border points of a1, a2, and a3 shown in FIG. 4) of the selected border points. In one embodiment, the fitting module 212 fits the straight line by applying the least square method.

The searching module 213 calculates a vertical distance between each selected border point (e.g., a1, a2, and a3 shown in FIG. 4) selected by the fitting module 212 and the straight line, sums each calculated distance to obtain a total distance. As shown in FIG. 4, h1 is the vertical distance between the border point a1 and the straight line L1, h2 is the vertical distance between the border point a2 and the straight line L1, h3 is the vertical distance between the border point a3 and the straight line L1. If the total distance (e.g., h1+h2+h3) is greater than or equal to a predetermined value, the searching module 213 regards a last border point of the selected border points as an inflection point of the border of the object in the binary image (refer to FIG. 2c). In one embodiment, the predetermined value has a length of one pixel. For example, if a value of h1+h2+h3 is greater than or equal to a length of one pixel, the last border point a3 of the selected border point is regarded as one of inflection points of the border of the object in the binary image. In FIG. 2c, the points of "A, B, C, D, E, and F" are the searched inflection points from FIG. 2b.

Figure 5:
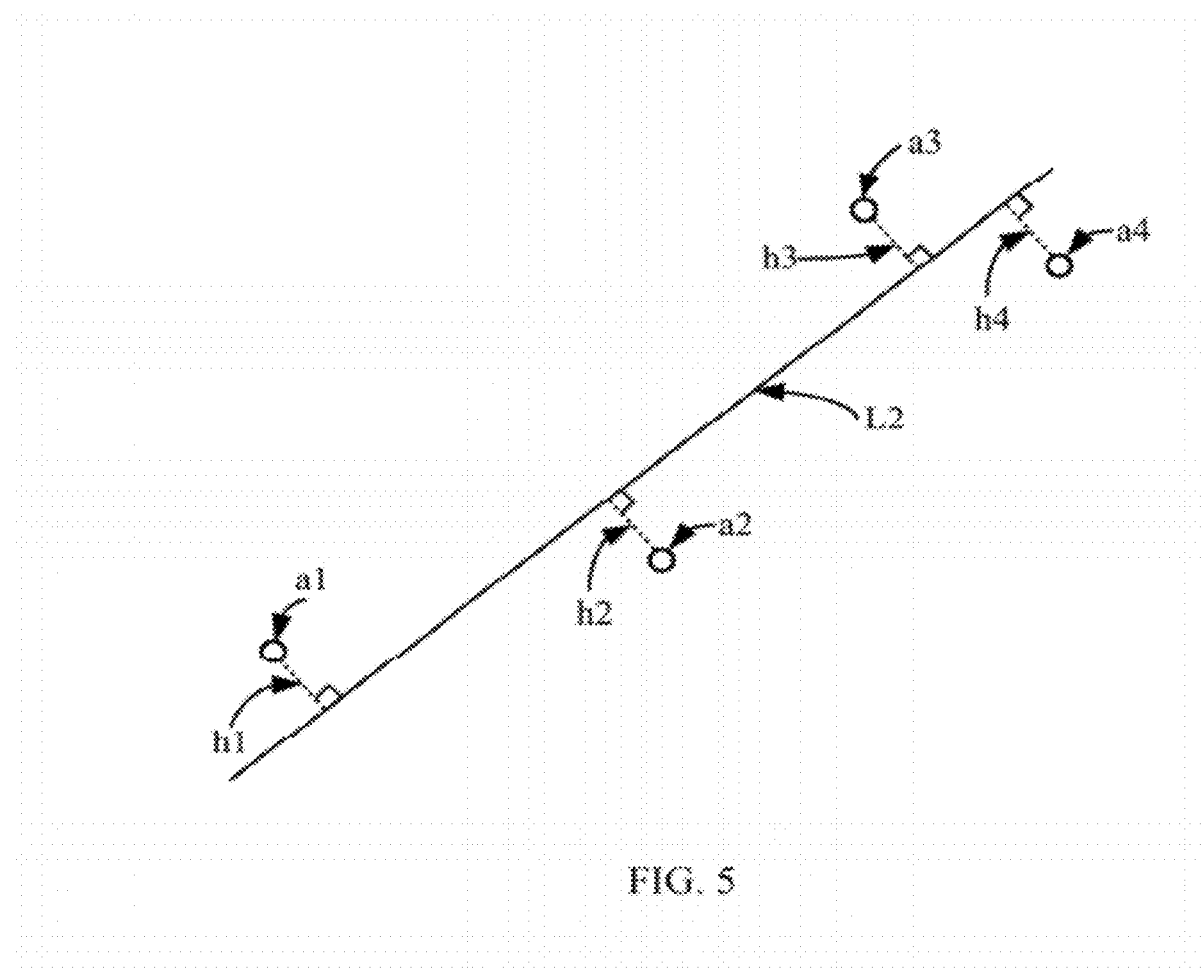
FIG. 5 is a schematic diagram of one embodiment of a fitting a new straight line L2.

The fitting module 212 further adds a new border point (e.g. a new border point a4 shown in FIG. 5) to the selected border points, so as to fit a new straight line (e.g., a straight line L2 fitted from the border points of a1, a2, a3, and a4 shown in FIG. 5) if the total distance is less than the predetermined value, and the searching module 213 further executes the above described calculating and adding operations to the new straight line, to search other inflection points of the border in the binary image of the object. In one embodiment, the newly added border point is a nearest point followed the selected border points. For example, supposing all of the sequential border points are stored in an array P, the selected border points are "P[0], P[1], P[2], P[3], and P[4]", then, the newly added border point is "P[5]" adjacent to P[4].

The searching module 213 further determines if a number of residual border points in the binary image is less than the predetermined number. If the number of the residual border points is greater than or equal to the predetermined number, the searching module 213 sequentially selects the predetermined number of other border points to fit another new straight line. For example, supposing the selected border points are "P[0], P[1], P[2], P[3], and P[4]", if the residual border points are "P[5], P[6], P[7], P[8], P[9], . . . , and P[100]", the searching module 213 sequentially selects the residual border points "P[5], P[6], P[7], P[8], and P[9]" to fit a new straight line. The searching module 213 further executes the above described calculating and adding operations to the new straight line, to search other inflection points of the border in the binary image of the object.

The outline generating module 214 connects all inflection points to obtain an outline of the object (refer to FIG. 2d) if the number of the residual border points is less than the predetermined number. If shape tolerances of the object are determined, the image measuring system 21 may further compare each inflection point of the object with each inflection point of a model object, so as to determine if the outline of the object matches an outline of the model object.

Figure 3:
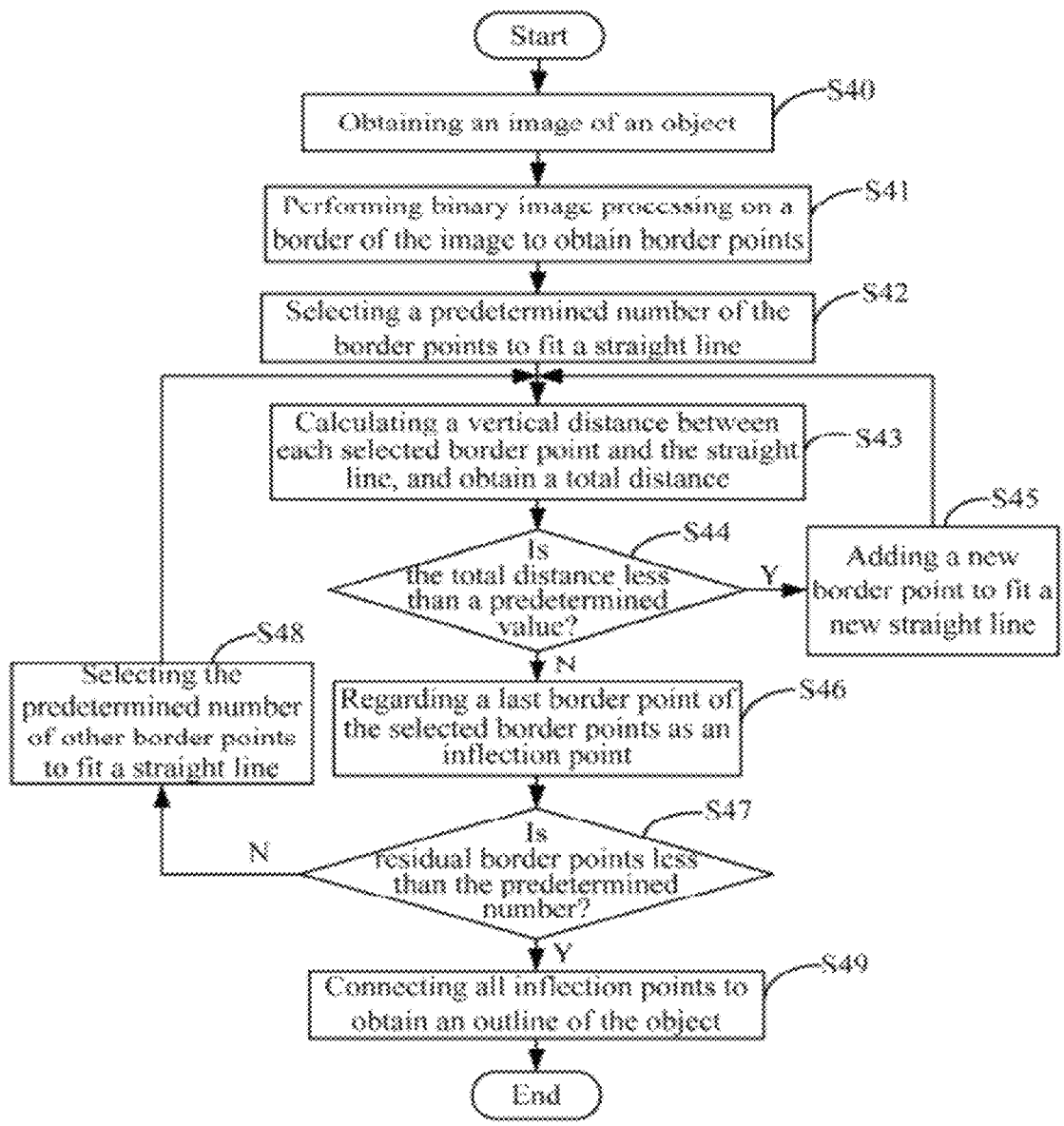
FIG. 3 is a flowchart of one embodiment of a method for determining inflection points in an image of an object.

FIG. 3 is a flowchart of one embodiment of a method for determining inflection points in an image of an object.

In block S40, the image obtaining module 210 obtains an image of an object (refer to FIG. 2a) from the image measuring machine 3.

In block S41, the image processing module 211 performs binary image processing on a border of the image to obtain a binary image (refer to FIG. 2b), obtains border points in the binary image, and stores data of the border points in the storage device 20. In one embodiment, the border points are sequential.

In block S42, the fitting module 212 selects a predetermined number of the border points in the binary image to fit a straight line of the selected border points. In one embodiment, the fitting module 212 fits the straight line by applying the least square method. A detailed description refer to FIG. 4.

In block S43, the searching module 213 calculates a vertical distance between each selected border point and the straight line, sums each calculated distance to obtain a total distance.

In block S44, the searching module 213 determines if the total distance is less than a predetermined value. The procedure goes to block S45 if the total distance is less than the predetermined value. Otherwise, the procedure goes to block S46 if the total distance is greater than or equal to the predetermined value.

In block S45, the fitting module 212 adds a new border point to the selected border points to fit a new straight line, then the procedure returns to block S43. In one embodiment, the newly added border point is a nearest border point followed the selected border points.

In block S46, the searching module 213 regards a last border point of the selected border points as an inflection point of the border of the object in the binary image (refer to FIG. 2c). In one embodiment, the predetermined value has a length of one pixel.

In block S47, the searching module 213 determines if a number of residual border points in the binary image is less than the predetermined number. If the number of the residual border points is greater than or equal to the predetermined number, the procedure goes to block S48. Otherwise, if the number of the residual border points is less than the predetermined number, the procedure goes to block S49.

In block S48, the searching module 213 sequentially selects the predetermined number of other border points to fit another new straight line, then the procedure returns to block S43.

In block S49, the outline generating module 214 connects all inflection points to obtain an outline of the object (refer to FIG. 2d). As mentioned above, if shape tolerances of the object are determined, the image measuring system 21 compares each inflection point of the object with each inflection point of a model object, so as to determine if the outline of the object matches an outline of the model object.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for determining inflection points in an image of an object, the method comprising:
    (a) obtaining the image of the object from an image measuring machine;
    (b) performing binary image processing on a border of the image to obtain border points of the image of the object, and storing data of the border points in a storage device;
    (c) selecting a predetermined number of the border points to fit a straight line of the selected border points;
    (d) calculating a vertical distance between each selected border point and the straight line, summing each calculated distance to obtain a total distance, and executing step (e) if the total distance is less than a predetermined value, or executing step (f) if the total distance is greater than or equal to the predetermined value;
    (e) adding a new border point to the selected border points to fit a new straight line, and going to step (d);
    (f) regarding a last border point of the selected border points as an inflection point of the border of the object; and
    (g) sequentially selecting the predetermined number of other border points to fit another new straight line if a number of the residual border points is greater than or equal to the predetermined number, and returning to step (d).

2. The method according to claim 1, further comprising: connecting all inflection points to obtain an outline of the object if the number of the residual border points is less than the predetermined number.

3. The method according to claim 1, wherein the border points are point-clouds of border of the object.

4. The method according to claim 1, wherein the predetermined value in step (d) has a length of one pixel.

5. The method according to claim 1, wherein fitting a straight line is achieved by the least square method.

6. The method according to claim 1, wherein the newly added border point in step (e) is a nearest point followed the selected border points.

7. A non-transitory computer readable medium having stored thereon instructions that, when executed by a processor of a computer, causes the processor to perform a method for determining inflection points in an image of an object, the method comprising:

(a) obtaining the image of the object from an image measuring machine;

(b) performing binary image processing on a border of the image to obtain border points of the image of the object, and storing data of the border points in a storage device;

(c) selecting a predetermined number of the border points to fit a straight line of the selected border points;

(d) calculating a vertical distance between each selected border point and the straight line, summing each calculated distance to obtain a total distance, and executing step (e) if the total distance is less than a predetermined value, or executing step (f) if the total distance is greater than or equal to the predetermined value;

(e) adding a new border point to the selected border points to fit a new straight line, and going to step (d);

(f) regarding a last border point of the selected border points as an inflection point of the border of the object; and (g) sequentially selecting the predetermined number of other border points to fit another new straight line if a number of the residual border points is greater than or equal to the predetermined number, and returning to step (d).

8. The non-transitory computer readable medium according to claim 7, wherein the method further comprises: connecting all inflection points to obtain an outline of the object if the number of the residual border points is less than the predetermined number.

9. The non-transitory computer readable medium according to claim 7, wherein the border points are point-clouds of border of the object.

10. The non-transitory computer readable medium according to claim 7, wherein the predetermined value in step (d) has a length of one pixel.

11. The non-transitory computer readable medium according to claim 7, wherein fitting a straight line is achieved by the least square method.

12. The non-transitory computer readable medium according to claim 7, wherein the newly added border point in step (e) is a nearest point followed the selected border points.

13. The non-transitory computer readable medium according to claim 7, wherein the medium is selected from the group consisting of a hard disk drive, a compact disc, a digital video disc, and a tape drive.

14. A computing system for determining inflection points in an image of an object, comprising:

an image obtaining module operable to obtain the image of the object from an image measuring machine;

an image processing module operable to perform binary image processing on a border of the image to obtain border points of the image of the object, and storing data of the border points in a storage device;

a fitting module operable to select a predetermined number of the border points to fit a straight line of the selected border points;

a searching module operable to calculate a vertical distance between each selected border point and the straight line, summing each calculated distance to obtain a total distance, and regard a last border point of the selected border points as an inflection point of the border of the object if the total distance is greater than or equal to the predetermined value;

the fitting module further operable to add a new border point to the selected border points to fit a new straight line if the total distance is less than the predetermined value; and the searching module further operable to sequentially select the predetermined number of other border points to fit another new straight line if a number of the residual border points is greater than or equal to the predetermined number.

15. The system according to claim 14, further comprising:

an outline generating module operable to connect all inflection points to obtain an outline of the object if the number of the residual border points is less than the predetermined number.

16. The system according to claim 14, wherein the border points are point-clouds of border of the object.

17. The system according to claim 14, wherein the predetermined value has a length of one pixel.

18. The system according to claim 14, wherein fitting a straight line is achieved by the least square method.

19. The system according to claim 14, wherein the newly added border point by the fitting module is a nearest point followed the selected border points.

* * * * *